United States Patent [19]

Sakamoto et al.

[11] Patent Number: 5,592,257
[45] Date of Patent: Jan. 7, 1997

[54] ELECTRONIC FLASH DEVICE WITH SLAVE EMISSION FUNCTION

[75] Inventors: Hiroshi Sakamoto, Kawasaki; Hideki Matsui, Fujisawa; Nobuyoshi Hagiuda, Yokohama, all of Japan

[73] Assignee: Nikon Corporation, Tokyo, Japan

[21] Appl. No.: 499,376

[22] Filed: Jul. 7, 1995

[30] Foreign Application Priority Data

Aug. 24, 1994 [JP] Japan .................................. 6-199864
Aug. 24, 1994 [JP] Japan .................................. 6-199866

[51] Int. Cl.$^6$ .................................................. G03B 7/26
[52] U.S. Cl. .................... 396/171; 315/241 P; 315/154; 315/200 A; 396/203; 396/301
[58] Field of Search .................... 315/241 P, 151, 315/155, 158, 154, 200 A; 354/418, 145.1, 127.12, 484, 132, 129, 131

[56] References Cited

U.S. PATENT DOCUMENTS

| Re. 32,437 | 6/1987 | Taniguchi et al. | 315/241 P X |
|---|---|---|---|
| 4,724,456 | 2/1988 | Ishimura et al. | 354/418 |
| 4,758,859 | 7/1988 | Uematsu et al. | 354/412 |
| 4,884,094 | 11/1989 | Kitaura et al. | 354/412 |
| 5,049,917 | 9/1991 | Yasukawa et al. | 354/484 |
| 5,136,327 | 8/1992 | Ogawa | 354/484 |
| 5,317,362 | 5/1994 | Takahashi | 354/418 |
| 5,384,611 | 1/1995 | Tsuji et al. | 354/131 |

*Primary Examiner*—Robert Pascal
*Assistant Examiner*—Haissa Philogene

[57] ABSTRACT

An electronic flash device having a slave emission function and a standby mode, includes a setting member for setting the slave emission function, activation means activated in response to an input generated upon the function setting operation of the setting member, and power supply control means for controlling a power supply of the electronic flash device to be turned on based on the activation of the activation means.

10 Claims, 7 Drawing Sheets

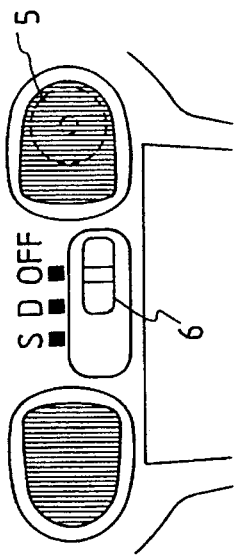
FIG. 1C
FIG. 1B
FIG. 1A
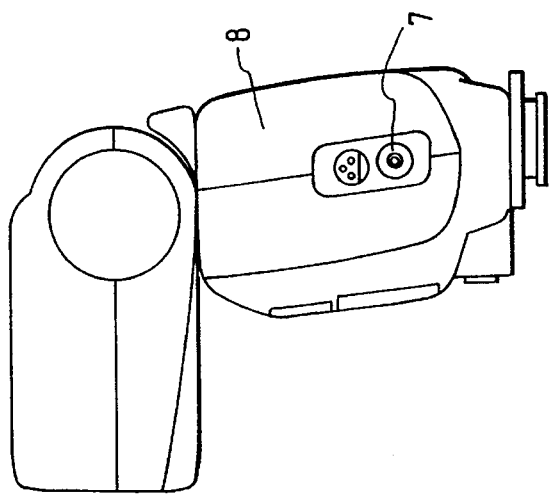
FIG. 2
FIG. 1D

ELECTRONIC FLASH DEVICE WITH SLAVE EMISSION FUNCTION

BACKGROUND OF THE INVENTION

1. Field of the Invention

The present invention relates to an electronic flash device with a slave emission function.

2. Related Background Art

Conventionally, an adapter, called a wireless multiple-flash adapter or a slave unit, for wireless-controlling an electronic flash device to emit light is available in this adapter, upon reception of a steep change in light by a light-receiving element, a switching element is turned on in response to this light, and a synchronous signal is output to control an electronic flash device connected to the adapter to emit light. Therefore, in a multiple-flash photographing operation using a plurality of electronic flash devices for illumination, the adapter and the electronic flash devices can be conveniently disposed at arbitrary positions. As the adapter, a stand-alone adapter and an adapter built in an electronic flash device are available. As an example of an adapter built in an electronic flash device, Japanese Laid-Open Utility Model Application No. 56-3527 is known.

For the purpose of energy savings of an electronic flash device, some electronic flash devices have a power mode, a so-called standby mode, for turning off the power supply of an electronic flash device after a non-operation state continues for a predetermined period of time.

However, when a slave unit is independent from an electronic flash device, their power supplies must be independently controlled since these power supplies are also independent from each other.

In the above-mentioned prior art, when the slave unit is built in the electronic flash device, and the device has a standby mode function, a problem which is not experienced so far is posed. For example, when the electronic flash device set in a slave mode is set solely, since a non-operation state continues, the power supply of the electronic flash device is automatically turned off, and cannot be synchronized with light emitted by a master flash device in a required photographing operation.

In some underwater electronic flash devices, the number of switches is limited to guarantee a waterproof effect. Therefore, in some devices, the standby mode and the slave function mode may be set by a single member, and hence, these modes cannot be set simultaneously.

Since a normal electronic flash device need not adopt a waterproof mechanism, a slave function setting switch and the like can be disposed at a relatively free position. In conventional devices, a light-receiving portion is normally disposed on a surface in the same direction as a light-emitting portion. When the slave function setting switch is disposed in the vicinity of the light-receiving portion, the meaning of the switch is easy to understand for a user, and an electronic flash device which is easy to use can be provided. In this case, since the power switch is normally disposed on the rear surface of the electronic flash device, a user may not notice that the electronic flash device is set in a standby state, and may complete only the setting operation of the device. Therefore, the above-mentioned problem that the device cannot be synchronized with light emitted by the master flash device in a photographing operation tends to be posed.

On the other hand, as disclosed in Japanese Laid-Open Patent Application No. 55-153927, a delay circuit is arranged between a photosensitive element and a switching element.

In the above-mentioned prior art, when a slave unit is built in an electronic flash device, and a slave circuit with a delay circuit is also proposed, a problem is posed upon switching between a conventional slave mode without any delay time and a slave mode with a delay time like in Japanese Laid-Open Patent Application No. 55-153927 in a single electronic flash device.

For example, a case will be examined below wherein the above-mentioned modes as the slave functions are switched by a normal arrangement, as shown in FIGS. 10 and 11.

Referring to FIG. 10, a slave function setting switch 6 has positions "S" and "D" corresponding to S and D modes (to be described later), and a position "OFF" at which no slave function is selected. In the S mode, slave emission is performed in real time in response to an optical signal; in the D mode, slave emission is performed after an elapse of a given delay time. Since there are three modes including the OFF mode, a microcomputer (to be referred to as a CPU hereinafter) requires 2-bit input ports. A port POUT of the CPU is an output port for outputting a synchronous signal for slave emission to a transistor on the output side.

When a light-receiving circuit SLV_CKT supplies an input to an interrupt input terminal INT_SLV of the CPU, interrupt processing shown in FIG. 11 is executed to perform slave emission. Note that # in FIG. 11 represents a step.

Referring to FIG. 11, during the interrupt processing starting from #60, since this electronic flash device has a plurality of slave emission modes, the mode must be discriminated in #61. Only when the S mode is selected, an output is generated from the port POUT to realize slave emission in #62. However, due to the presence of #61, the slave emission is delayed by the execution time of this decision step. Since the conventional device has a hardware arrangement, a high-speed response is realized. However, recently, a microcomputer is used too often at the cost of the high-speed response., If the high-speed response is disturbed, especially when a small amount of light is to be emitted, only the light emission by the master flash device is performed first, and the degree of contribution of a slave-side electronic flash device is considerably lowered upon automatic light control. As a result, a multiple-flash effect cannot often be obtained.

SUMMARY OF THE INVENTION

It is an object of the present invention to provide an electronic, flash device with a slave function, which can reliably attain slave emission without requiring a user to pay a special attention to a standby state of the power supply.

It is another object of the present invention to provide an electronic flash device with a slave function, comprising control means which can realize a flexible slave emission function by the use of a microcomputer without sacrificing the high-speed response even when the interrupt function of the microcomputer is utilized.

In order to achieve the above objects, according to the first aspect of the present invention, there is provided an electronic flash device having a slave emission function and a standby mode, comprising: a setting member for setting the slave emission function; activation means activated in response to an input generated upon the function setting operation of the setting member; and power supply control means for controlling a power supply of the electronic flash device to be turned on based on the activation of the activation means.

Preferably, the activation means and the power supply control means comprise a microcomputer.

The input which is input to the activation means is preferably an interrupt trigger generated upon operation of the setting member. The setting member preferably comprises a non-shorting type slide switch.

In the first aspect of the present invention, since the electronic flash device comprises the setting member for setting the slave emission function, the activation means which is activated in response to an interrupt input generated upon the function setting operation of the setting member, and the power supply control means for controlling the power supply of the electronic flash device to be turned on upon activation by the activation means, even when the power switch is in an OFF state, an interrupt is generated upon manual operation of the setting member for setting the slave emission function, and the CPU is activated, thereby turning on the power supply of the electronic flash device. Therefore, slave emission can be reliably attained without requiring a user to pay a special attention to the standby state of the power supply.

According to the second aspect of the present invention, there is provided an electronic flash device having a slave emission function, comprising: a light-receiving portion for receiving an optical signal; control means for controlling a sequence of the slave emission function; an input terminal of the control means, which receives a signal from the light-receiving portion; a plurality of input/output terminal of the control means, which are prepared in correspondence with a plurality of timings, and can output signals at different timings; switching means comprising a signal input terminal for receiving one of the signals at the different timings, and an output terminal for outputting a signal on the basis of one of the signals at the different timings; and switch means for selectively connecting the plurality of input/output terminals to the signal input terminal, and selecting and setting a plurality of timings from light reception until light emission, wherein the control means reads a setting state of the switch means by setting the plurality of input/output terminals in an input mode, and when the input terminal of the control means receives the signal from the light-receiving portion, the control means outputs timing signals from the plurality of input/output terminals.

The control means preferably comprises a microcomputer. In this case, the input terminal of the control means corresponds to the interrupt input terminal of a microcomputer.

The switch means preferably comprises a non-shorting type slide switch.

In the second aspect of the present invention, as shown in FIG. 3, a CPU serving as the control means reads the setting state of a slave function setting switch 6 by setting a plurality of input/output terminals PS and PD in the input mode. When an input terminal INT_SLV of the CPU as the control means receives a signal from a light-receiving portion SLV_CKT as an interrupt signal, the CPU controls the plurality of input/output terminals to output timing signals. For this reason, a flexible slave emission function can be realized by the use of a microcomputer without sacrificing the high-speed response even when the interrupt function of the microcomputer is utilized.

The above and other objects, features and advantages of the present invention are explained hereinafter and may be better understood by reference to the drawings and the descriptive matter which follows.

BRIEF DESCRIPTION OF THE DRAWINGS

FIG. 1A is a front view of an electronic flash device according to an embodiment of the present invention;

FIG. 1B is a side view of the electronic flash device according to the embodiment of the present invention;

FIG. 1C is a rear view of the electronic flash device according to the embodiment of the present invention;

FIG. 1D is a view showing the outer appearance of an attachment member of the electronic flash device according to the .embodiment of the present invention;

FIG. 2 is a view showing the outer appearance of a slave function setting switch of the electronic flash device according to the embodiment of the present invention;

DETAILED DESCRIPTION OF THE PREFERRED EMBODIMENTS

Figure 3:
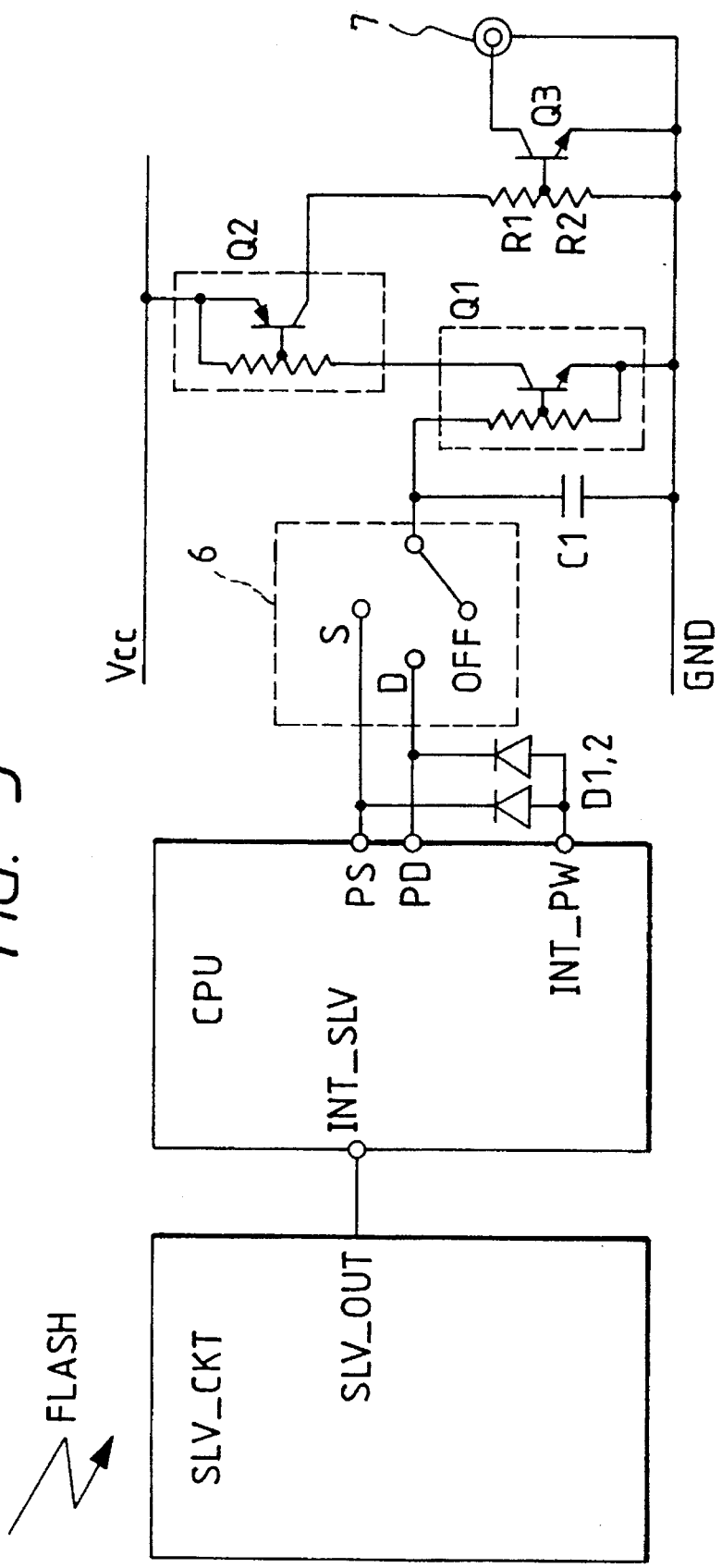
FIG. 3 is a circuit diagram showing the electrical circuit arrangement of the electronic flash device according to the embodiment of the present invention.

Referring to FIGS. 1A to 1C, a light-emitting portion 1 is vertically and horizontally rotatable with respect to a main body 8, and can attain a photographing operation using bounced light. Light-receiving portions 5 for a slave function (to be described later), and a slave function setting switch 6 are disposed adjacent to each other on the front surface of the main body 8. The slave function setting switch 6 has three positions "S", "D" and "OFF", as shown in FIG. 2. A synchronous terminal 7 for a slave unit is arranged on the side surface of the main body 8. A power switch 2, various setting switches 3, and an LCD display unit 4 are disposed on the rear surface of the main body 8.

The electronic flash device has the following slave functions.

(1) Slave S Mode

In the S mode, the device emits light with a minimum delay in response to the steep leading edge of an optical signal .from another electronic flash device, which signal is received by the light-receiving portions 5. This mode corresponds to the wireless multiple-flash mode which is known to those who are skilled in the art.

(2) Slave D Mode

In the D mode, the device emits light after a predetermined delay time from the steep leading edge of an optical signal from another electronic flash device, which signal is received by the light-receiving portions 5.

The setting operation of the above-mentioned slave modes and the actual operations will be described in turn below. FIG. 2 is an enlarged view of the slave function setting switch 6. The slave function setting switch 6 is a slide switch, and has three positions, i.e., the above-mentioned positions "S" and "D", and a position "OFF" at which the slave function is not selected. In FIG. 2, the position "OFF" is selected.

The slave function setting switch 6 is connected to the circuit shown in FIG. 3. A microcomputer (to be referred to as a CPU hereinafter) which controls the electronic flash device has four ports associated with the slave function. A light-receiving circuit SLV__CKT converts the steep leading edge of an optical signal received by the light-receiving portions 5 into a pulse signal, and the CPU receives the output from the circuit SLV__CKT at an interrupt input terminal INT__SLV. Terminals S and D of the slave function setting switch 6 are connected to I/O ports PS and PD of the CPU, and an OR of the ports PS and PD is connected to an interrupt input terminal INT__PW via diodes D1 and D2.

The slave function setting switch 6 is a non-shorting type switch. Therefore, one of the ports PS and PD of the CPU is connected to the base of a resistor built-in transistor Q1, or the base of the resistor built-in transistor Q1 is opened at the position "OFF". A capacitor C1 serves to absorb noise, and may be omitted. As the capacitance of the capacitor C1, a relatively small capacitance is selected not to cause a signal delay.

The collector output of the resistor built-in transistor Q1 is connected to the base of a resistor built-in transistor Q2, and the collector output of the resistor built-in transistor Q2 can supply a current high enough to drive a transistor Q3. Since the transistor Q3 directly drives a synchronous signal, a small-to-medium power transistor having a high withstanding voltage is selected with a margin so as to match with electronic flash devices having various terminal voltages. Therefore, a resistor built-in transistor is not used, but resistors R1 and R2 are externally connected to the transistor Q3. As shown in FIG. 1B, the synchronous terminal 7 serves as an output terminal for a slave unit of the electronic flash device, and is also connected to a synchronous signal input terminal (not shown) of the electronic flash device. Therefore, the CPU outputs signals from the ports PS and PD to activate light emission by itself via the slave function setting switch 6 and the transistors Q1 to Q3. More specifically, the electronic flash device can perform normal light emission in response to a synchronous signal from a camera, and light emission by the above-mentioned slave function.

Figure 4:
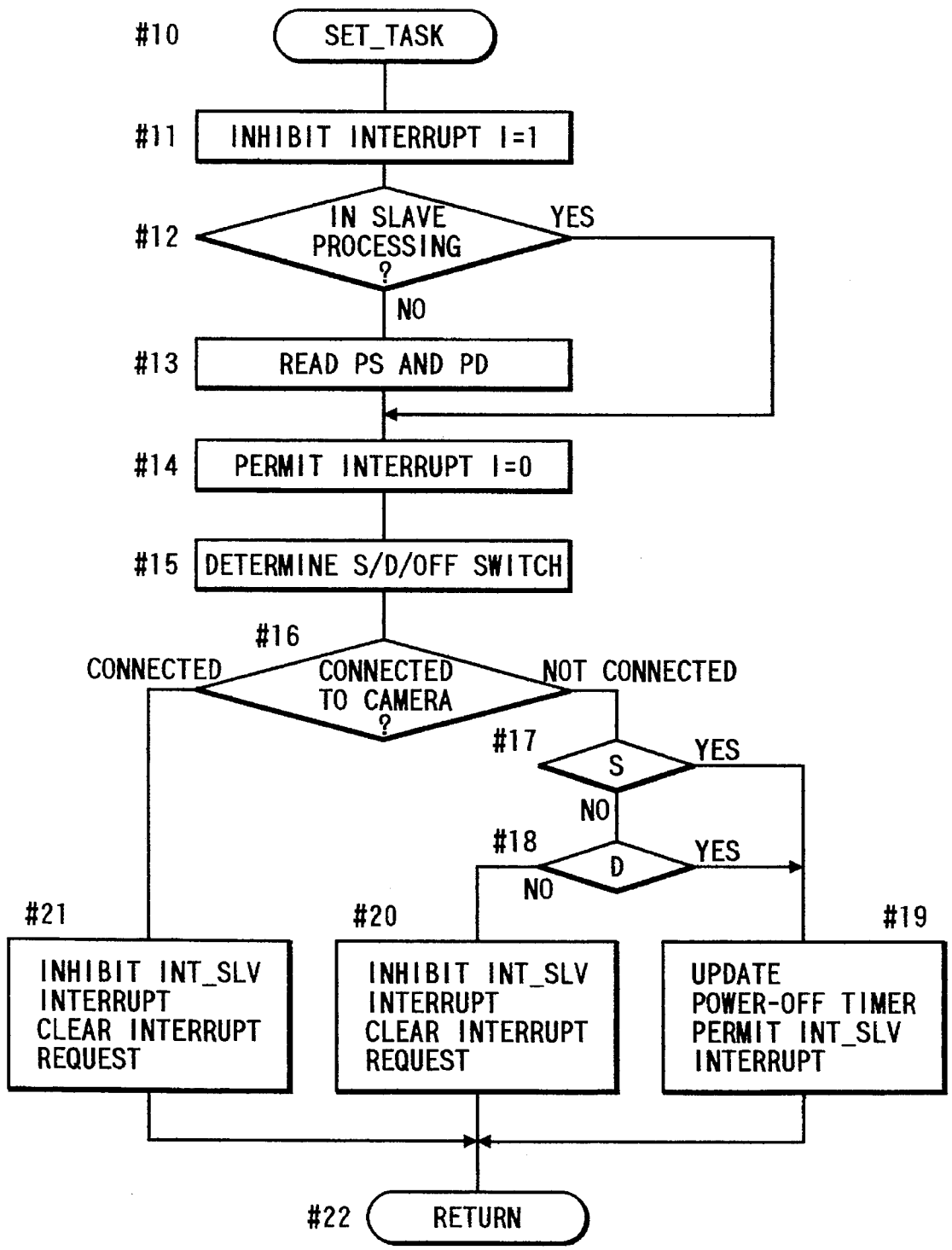
FIG. 4 is a flow chart of software of a microcomputer of the electronic flash device according to the embodiment of the present invention, i.e., showing slave function setting processing.

The operation of the slave function will be explained below as well as the software of the CPU. Note that symbol # in the following description means a step. FIG. 4 shows the flow of the processing associated with the slave function setting operation. This task is executed at predetermined time intervals, and is started when a label in #10 is called. In #11, all interrupts are inhibited. The reason for this inhibition will be explained later. In #12, it is checked if another slave processing is being executed. As the discrimination method for this purpose, a flag (not shown) is used, and is activated only during execution of slave processing. If NO in #12, since the ports PS and PD as the slave function setting switch 6 are not being accessed by the task of another slave processing, port status data can be read in #13. Even if the light-receiving circuit SLV__CKT receives effective light at this instance and triggers the interrupt input terminal, since the interrupts have been inhibited in #11 in this state, the read operation of port data is not disturbed by the task of another slave processing.

In the read operation of port data, the I/O direction registers of the ports are set in the input mode. At this time, the ports are pulled up and port data are fetched and stored. After the data registers of the ports are set at L, the direction registers are set in the output mode. In this manner, the port data can be read without supplying any output to the transistor Q1. Therefore, the ports PS and PD are set in an input state during only a given period in #13, and are set to generate outputs L in other ordinary states. In FIG. 3, these ports are active L, since the selected port is grounded via the base terminal of the resistor built-in transistor Q1. In order to allow to read L level in the input mode and to prevent the transistor Q1 from being turned on by a current flowing out from the pull-up element (not shown) for each port, the base-emitter resistance or the like of the transistor Q1 has a sufficiently small value. When these ports are not selected by the slave function setting switch 6, they are open, and change to H level by the above-mentioned pull-up. As a result, outputs H from these ports can be reliably read. In this manner, these ports can serve as both input and output ports.

On the other hand, if it is determined #12 that slave processing is being executed, since the ports PS and PD may be being accessed by the task of another slave processing, the flow skips #13, i.e., port data are not read.

In #14, the interrupt inhibition state is canceled. Therefore, since interrupts are inhibited from #11 to #14, the device cannot immediately respond to light received during this interval. However, since the light-emitting timing rarely overlaps this interval, no practical problem is posed.

In #15, the state of the slave function setting switch 6 is determined on the basis of the latest read data. As described above, the port selected by the slave function setting switch 6 is at L level. When the position "OFF" is selected, since both the ports are open, the mode is determined based on (PS, PD)=(H, H), as shown in Table 1 below. Note that (L, L) is an impossible combination. However, if this state is set, the determined value of the mode is left unchanged, and the immediately preceding discrimination result is used.

TABLE 1

| PS | PD | Determined Mode |
| --- | --- | --- |
| H | H | OFF |
| H | L | D Mode |
| L | H | S Mode |
| L | L | Determined Left Unchanged |

In #16, the flow branches depending on whether or not the electronic flash device is connected to the camera. This branching step is important, and the electronic flash device connected to the camera must not perform light emission in response to light emission of another electronic flash device since it is the master flash device. On the contrary, any electronic flash device which is not connected to the camera must perform slave emission since it is a slave unit. In #16, it is checked based on the state of electrical contacts 9 provided to an attachment member shown in FIG. 1D if the device is connected to the camera.

Figure 7:
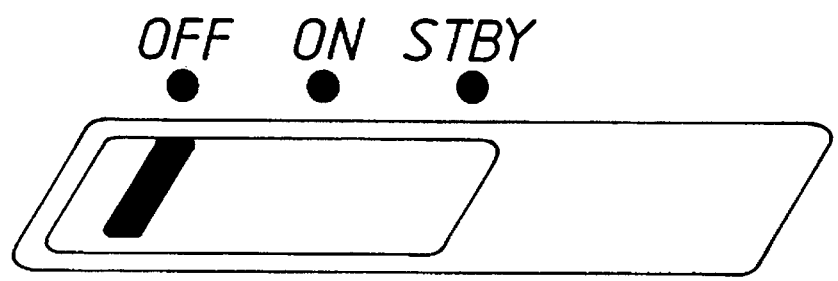
FIG. 7 is an enlarged view showing the outer appearance of a power switch of the electronic flash device according to the embodiment of the present invention.
Figure 9:
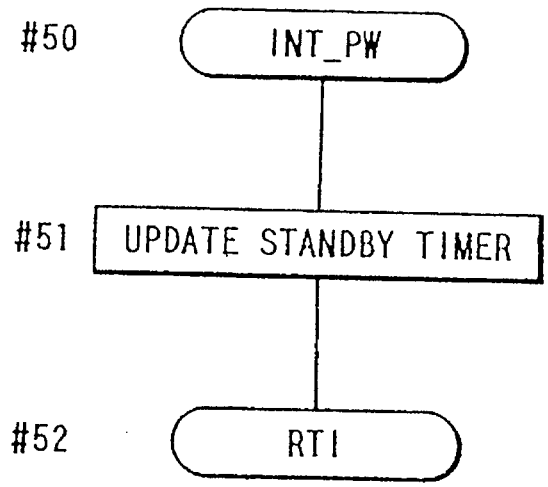
FIG. 9 is a flow chart of software of the microcomputer of the electronic flash device according to the embodiment of the present invention, i.e., showing INT_PW terminal interrupt processing.
Figure 11:
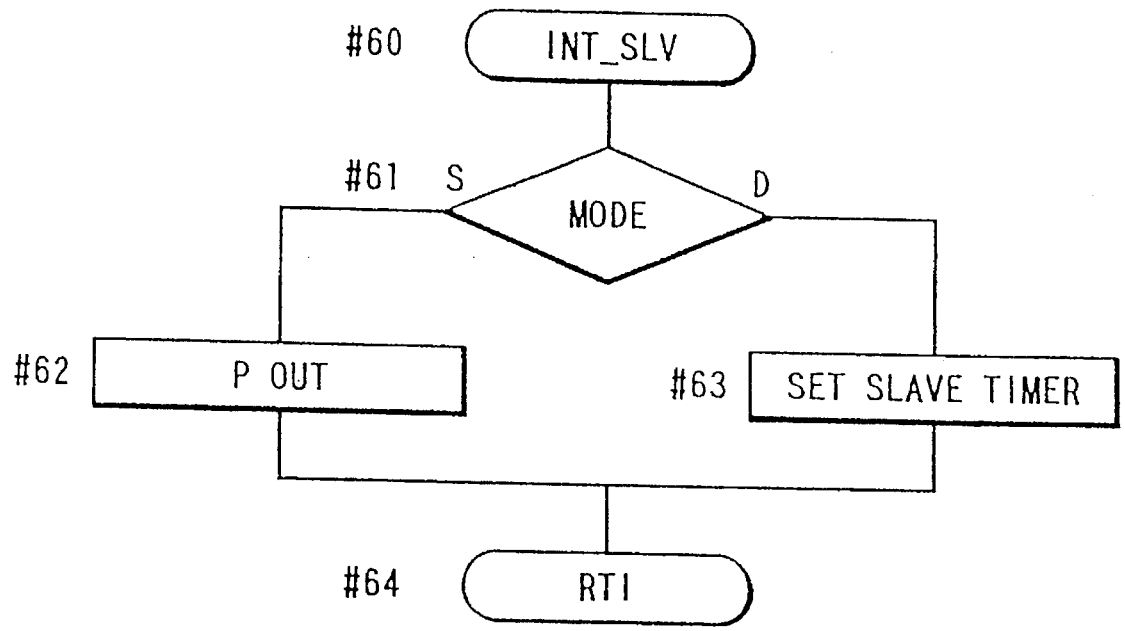
FIG. 11 is a flow chart of software according to the prior art.
Figure 10:
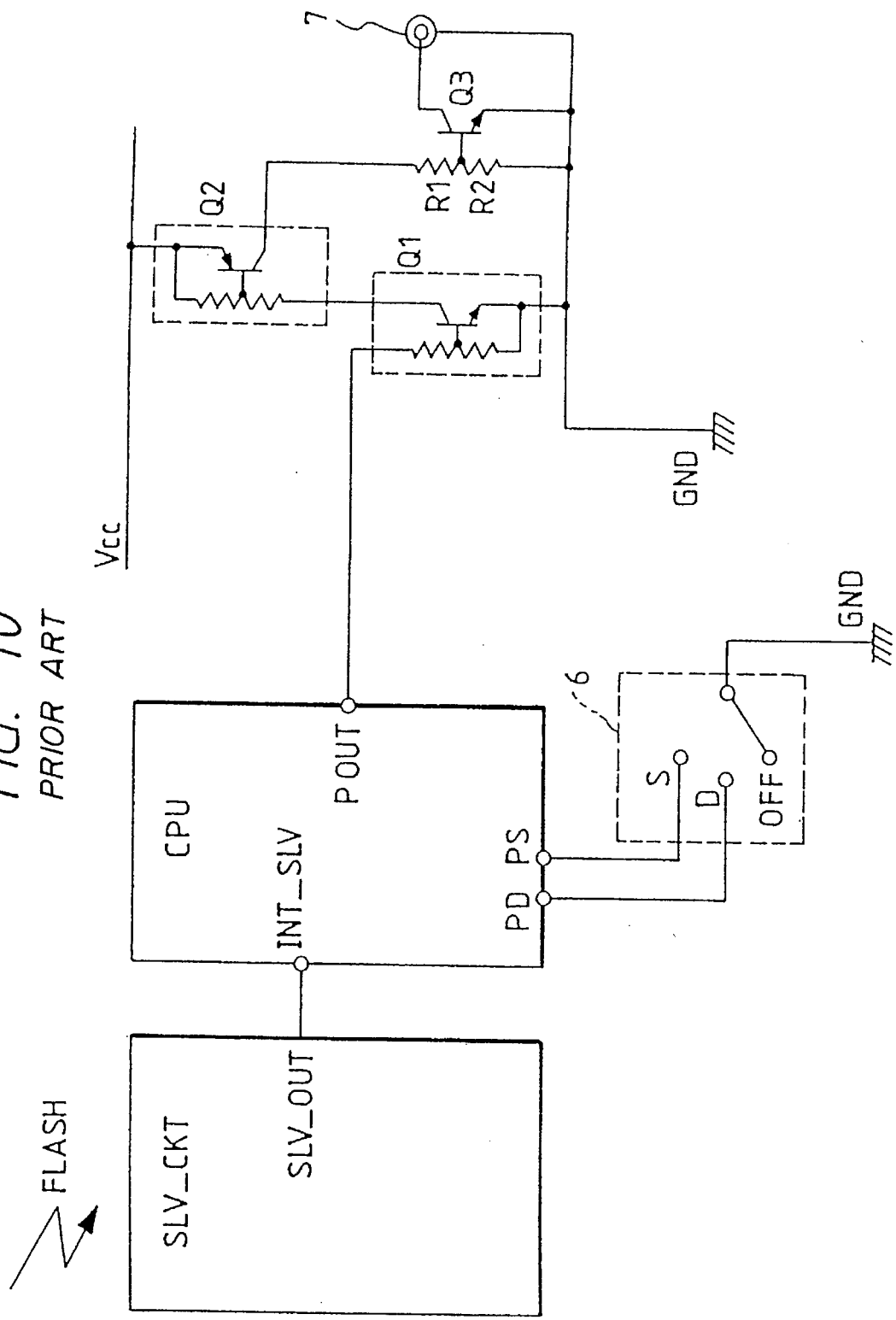
FIG. 10 is a circuit diagram showing the arrangement according to the prior art.

Processing in #17 and subsequent steps in a case wherein the device is not connected to the camera will be explained below. In this case, slave emission must be performed depending on the selected mode, as described above. If it is determined in #17 or #18 that the S or D slave emission mode is selected, the flow advances to #19 to execute the two processing operations. First, a power-OFF timer of the electronic flash device is updated to prevent the timer from automatically turning off the power supply in a non-operation state. FIG. 7 is an enlarged view of the power switch 2 shown in FIG. 1C. When a non-operation state continues for 80 seconds while the power switch 2 is set at a position "STBY", the power supply of the electronic flash device is turned off to cut the consumption power current. If the electronic flash device is connected to the camera, the power supply of the electronic flash device is resumed by, e.g., the electrical contacts 9 shown in FIG. 1D in cooperation with the start of the power supply of the camera. However, since the electronic flash device as a slave unit is an independent unit, it cannot be activated by the camera. Therefore, in order to inhibit the device from being turned off even when the power switch 2 is set at the position "STBY", the power-OFF timer for counting up to 80 seconds is always updated and kept to be 0. On the contrary, when the slave function setting switch 6 is switched from the position "OFF" to the position "S" or "D" while the power switch 2 is set at the position "STBY" and the electronic flash device is OFF, the power supply of the electronic flash device must be restored to an ON state. In the circuit diagram shown in FIG. 3, since the terminal INT_PW of the CPU is connected to the port PS or PD via the diodes D1 and D2, if a trailing edge interrupt of the terminal INT_PW is enabled before a restartable power-OFF state, the CPU can be enabled upon operation of the slave function setting switch 6, and the electronic flash device can be restored to the ON state. When the power supply is turned off by manually operating the power switch 2 to a position "OFF", since it is a forced power-OFF operation, the above-mentioned trailing edge interrupt of the terminal INT_PW is not enabled. Note that the interrupt processing of the terminal INT_PW is started by jumping to an interrupt vector in #50, as shown in FIG. 9. A standby timer is updated in #51, and the flow returns from the interrupt in #52. Since the timer is updated in #51, the power supply is not immediately turned off immediately after activation. Thereafter, since the standby timer is kept updated by the processing shown in FIG. 4, the power supply is not turned off even when the electronic flash device is set in the standby mode.

The other processing in #19 is to enable an interrupt of the terminal INT_SLV. If the light-receiving circuit SLV_CKT shown in FIG. 3 outputs an H pulse upon reception of light, the terminal INT_SLV must be interrupted in response to a leading edge. Therefore, after #19, slave emission is enabled.

On the other hand, if it is determined in #17 and #18 that the slave mode is OFF, the flow advances to #20 to inhibit the interrupt of the terminal INT_SLV and to clear the interrupt request. Therefore, since no interrupt is generated, a series of slave function operations will not be executed.

In this manner, the setting operation of the slave function of the electronic flash device, which is not connected to the camera, is completed, and the flow returns in #22.

On the other hand, if it is determined in #16 that the electronic flash device is connected to the camera, the flow advances to #21. As described above, since the master flash device does not perform slave emission, the interrupt of the terminal INT_SLV is inhibited and the interrupt request is cleared as in #20. Thereafter, the flow returns in #22.

As described above, the processing associated with the slave function setting operation is completed.

Figure 5:
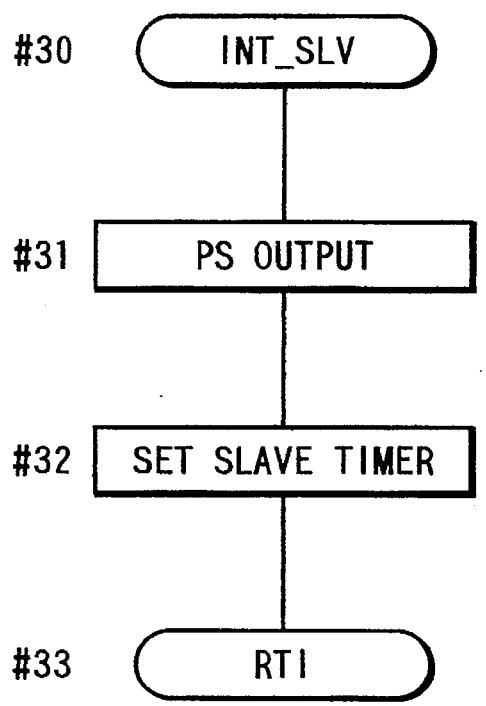
FIG. 5 is a flow chart of software of the microcomputer of the electronic flash device according to the embodiment of the present invention, i.e., showing INT_SLV interrupt processing.

Next, the processing from when the light-receiving circuit SLV_CKT receives light until the electronic flash device performs slave emission will be explained below. FIG. 5 shows the INT_SLV interrupt processing. In #31 immediately after the interrupt processing is started in #30, an H-level signal is output from the port PS. Since the port PS is normally set to output an L-level signal, an H-level signal can be immediately output by changing the data register to H. In practice, since a bit operation command is used, and various registers can be prevented from being destroyed, an output to the port may be executed prior to saving of the register normally executed in #30. Therefore, the number of commands inserted from when the INT_SLV interrupt is generated until the port PS changes is minimum, and a quick response can be made by fully utilizing the CPU performance.

If the slave function setting switch 6 is set in the S mode, the transistors Q1, Q2, and Q3 are turned on in turn in response to the H-level output from the port PS, and a synchronous signal is output. In response to this signal, the electronic flash device itself and another electronic flash device or devices connected to the synchronous terminal 7 can perform light emission.

Figure 8:
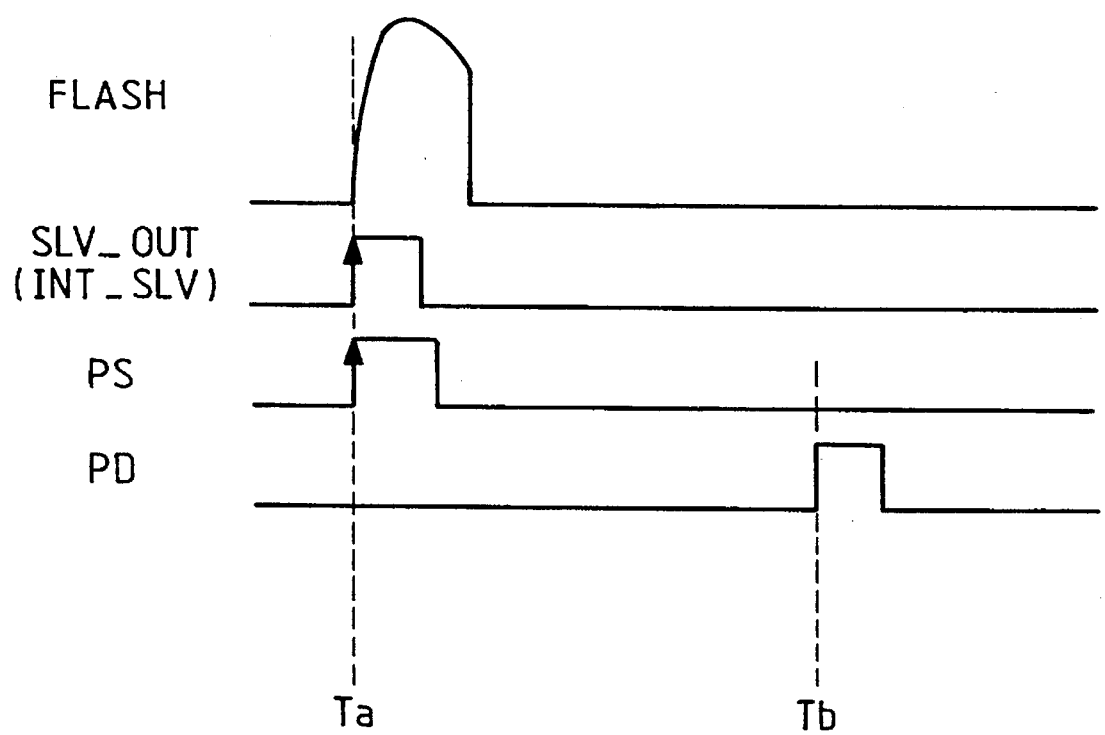
FIG. 8 is a timing chart upon execution of a slave function of the electronic flash device according to the embodiment of the present invention.

FIG. 8 is a timing chart showing this state. As shown in FIG. 8, a signal is input to the INT_SLV terminal at the leading edge of a light-emission waveform FLASH, and an H-level signal is output from the port PS with almost no delay time, as described above.

Referring back to FIG. 5, the port PS is reset to L in #31, and a slave timer for forming a delay time for the D mode is set in #32. For example, 1 ms longer than the flash time of the electronic flash device is set in the timer. This slave timer generates a timer interrupt after an elapse of the setting time.

In #33, restoration processing from the interrupt is performed, and the flow returns. As described above, the slave processing in the S mode is completed. If the slave function setting switch 6 is set in the D mode, since the port PS is not connected to any circuit on its output side, it does not operate, and is completely isolated from the circuitry for the S mode.

Figure 6:
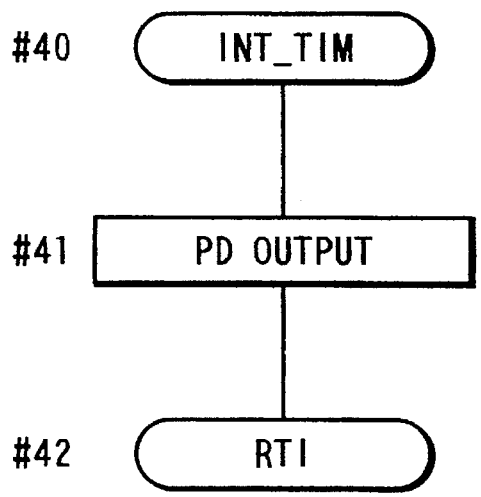
FIG. 6 is a flow chart of software of the microcomputer of the electronic flash device according to the embodiment of the present invention, i.e., showing INT_TIM interrupt processing.

In the case of the D mode, after an elapse of the slave timer time, a timer interrupt is generated at time Tb in FIG. 8, and INT_TIM processing in FIG. 6 is started in #40. When an H-level signal is output to the port PD in #41, this signal immediately generates a synchronous signal.

As can be seen from FIG. 8, after the light emission of the master flash device is stopped by automatic light control, the synchronous signal for the D mode is generated. Therefore, the slave emission in the D mode is independently performed without influencing the light control, such as TTL automatic light control, of the master flash device.

Having described specific embodiments of the present invention, it is to be understood that any variations will occur to those skilled in the art within the scope of the appended claims.

What is claimed is:

1. An electronic flash device having a slave emission function and a standby mode, comprising:

a setting member to set the slave emission function; and power supply control means for controlling a power supply of said electronic flash device to be turned on when the slave emission function is set by said setting member and the electronic flash device is in the standby mode.

2. A device according to claim 1, wherein said activation means and said power supply control means comprise a microcomputer.

3. A device according to claim 1, wherein an interrupt is triggered based on the operation of said setting member and said power supply control means controls the power supply in response to the interrupt.

4. A device according to claim 1, wherein said setting member comprises a non-shorting type slide switch.

5. An electronic flash device having a slave emission function, comprising:

a light-receiving portion for receiving an optical signal;

control means for controlling a sequence of the slave emission function;

an input terminal of said control means, which receives a signal from said light-receiving portion;

a plurality of input/output terminals of said control means, which are prepared in correspondence with a plurality of timings, and can output signals at different timings;

switching means comprising a signal input terminal for receiving one of the signals at the different timings, and an output terminal for outputting a signal on the basis of one of the signals at the different timings; and switch means for selectively connecting said plurality of input/output terminals to said signal input terminal, and selecting and setting a plurality of timings from light reception until light emission, wherein said control means reads a setting state of said switch means by setting said plurality of input/output terminals in an input mode, and when said input terminal of said control means receives the signal from said light-receiving portion, said control means outputs timing signals from said plurality of input/output terminals.

6. A device according to claim 5, wherein said control means comprises a microcomputer.

7. A device according to claim 5, wherein said input terminal of said control means corresponds to an interrupt input terminal of a microcomputer.

8. A device according to claim 5, wherein said switch means comprises a non-shorting type slide switch.

9. An electronic flash device with a slave emission mode and a standby mode in which a power supply of the electronic flash device is turned off after a predetermined amount of time of inactivity, comprising:

a slave emission selecting device to generate an interrupt when selecting the slave emission mode; and an interrupt processing device to keep the power on based on the interrupt when the electronic flash device is in the standby mode.

10. A method of controlling a power supply of an electronic flash device with a slave emission mode and a standby mode in which the power is turned off after a timer reaches a predetermined amount of time of inactivity, comprising the steps of:

selecting the slave emission mode by a selecting device;

generating an interrupt when the slave emission mode is selected in said selecting step; and preventing the timer from reaching the predetermined time when the electronic flash device is in the standby mode.

* * * * *